United States Patent [19]
Mastrolia et al.

[11] 3,883,375
[45] May 13, 1975

[54] SOLID PROPELLANT COMPOSITIONS CONTAINING POLYMERIC BINDERS WITH AZIRIDINYL CURING AGENTS

[75] Inventors: Edmund J. Mastrolia, Sacramento; Charles B. Frost, Fair Oaks; Gerald A. Wessler, Rancho Cordova, all of Calif.

[73] Assignee: Aerojet - General Corporation, Azusa, Calif.

[22] Filed: Feb. 3, 1964

[21] Appl. No.: 343,446

[52] U.S. Cl. .......................... 149/19.9; 149/19.91
[51] Int. Cl. ............................................. C06d 5/06
[58] Field of Search .............. 149/19, 19.9, 19.91; 260/89.3

[56] References Cited
UNITED STATES PATENTS

| | | | |
|---|---|---|---|
| 2,306,139 | 12/1942 | Pollack | 260/89.3 |
| 2,587,558 | 2/1952 | Westfahl et al. | 260/89.3 |
| 3,087,844 | 4/1963 | Bice | 149/19 |
| 3,147,161 | 9/1964 | Ahere et al. | 149/19 |

Primary Examiner—Benjamin R. Padgett
Attorney, Agent, or Firm—E. O. Ansell

EXEMPLARY CLAIM

1. A high energy propellant composition comprising an oxidizer and the reaction product of a terminally reactive polymer having the formula:

$$A_3(Y_3)_p$$

wherein $A_3$ comprises a polymer of a polymerizable vinylidene compound; $Y_3$ is selected from the group consisting of carboxy, hydroxy, amine and mercapto, and p is an integer of at least 2; with a curing agent selected from the group consisting of those having the formula:

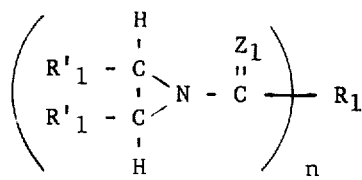

wherein $R_1$ is selected from the group consisting of alkylene, arylene, trivalent organic radicals of the formula:

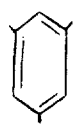

organic radicals of the formula:

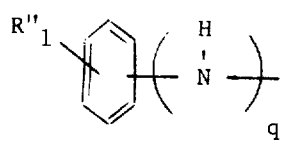

wherein $q$ is an integer of from 2 to 3 and $R''_1$ is selected from the group consisting of hydrogen and lower alkyl; and divalent radicals of the formula:

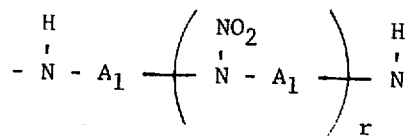

wherein $A_1$ is alkylene, and $r$ is selected from the group consisting of 0 and 1; $n$ is an integer of from 2 to about 4 and corresponds numerically to the valence of $R_1$; $R'_1$ is selected from the group consisting of hydrogen and lower alkyl and $Z_1$ is selected from the group consisting of oxygen and sulfur; and those having the formula:

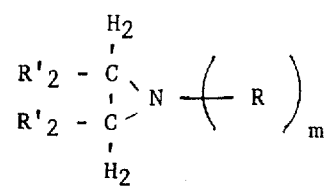

wherein $R_2$ is selected from the group consisting of alkylene, arylene, a trivalent radical of the formula:

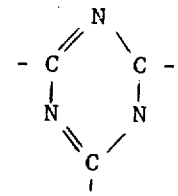

a radical of the formula:

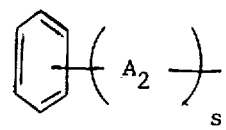

wherein $A_2$ is lower alkylene and $s$ is an integer of from 2 to 3; and a trivalent organic radical of the formula:

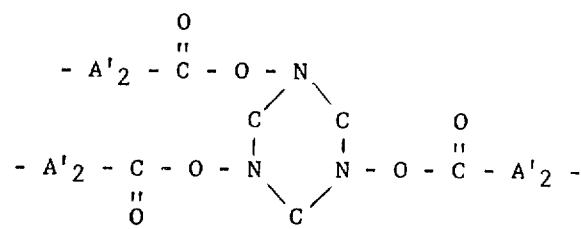

wherein $A'_2$ is lower alkylene; $m$ is an integer of from 2 to about 4, and corresponds numerically to the valence of $R_2$, and $R'_2$ is selected from the group consisting of hydrogen and lower alkyl.

13 Claims, No Drawings

SOLID PROPELLANT COMPOSITIONS CONTAINING POLYMERIC BINDERS WITH AZIRIDINYL CURING AGENTS

This invention relates to novel cured polymeric compositions and solid propellants having as the binder, such cured polymeric compositions.

Heretofore, numerous polymeric materials have been employed as binders in solid propellant compositions. However, the known polymeric binders have suffered from various disadvantages. Thus, for example, many of the known propellant binders require relatively high core temperatures. While elevated core temperatures are not a serious drawback in the manufacture of small solid rocket motors, this limitation becomes very serious when it is desired to prepare large scale solid rocket motors such as those which are proposed for use in interplanetary travel. Further, the known propellants are not able to withstand a constant strain for an extended period of time and over a wide range of relative humidity. Also, many of the known propellants are not sufficiently thermally stable to permit their storage in underground silos, for example, for prolonged periods on the order of months or years. Recently, a binder system for use in solid rocket propellants employing certain phosphorous-containing aziridine compounds as the essential curing agent has been proposed. However, the propellants containing this binder system have been found to be deficient, particularly in regard to storage stability. The physical properties of these propellants tend to deteriorate rapidly when stored under the prevailing ordinary conditions.

Accordingly, it is an object of this invention to prepare high energy solid propellant compositions which display improved processability, and can be cured at relatively low temperatures. It is a further object of this invention to prepare a novel solid propellant composition possessing a highly desirable balance of mechanical properties, and outstanding age and humidity resistance. Still another object of this invention is to provide a propellant composition which can be formulated for a very high-solids (metal fuel/oxidixer) content. These and other objects of this invention will become apparent from the detailed description which follows.

It has now been found that certain classes of aziridinyl compounds can be used as curing agents for a wide variety of low molecular weight, functionally terminated polymers. One such class of aziridinyl compounds has the general formula:

(I)
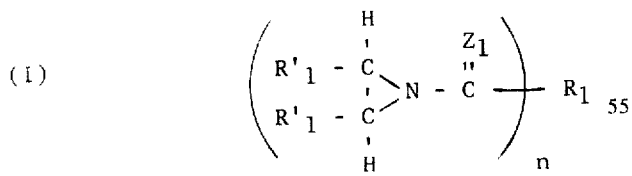

wherein $R_1$ is an organic radical selected from the group consisting of alkylene, preferably from 2 to 20 carbon atoms; arylene, preferably from 6 to 12 carbon atoms; trivalent organic radicals of the formula:

divalent or trivalent organic radicals of the formula:

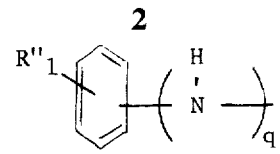

wherein $q$ equals 2 or 3, and $R''_1$ is hydrogen or lower alkyl of 1 to 4 carbons, preferably methyl divalent radicals of the formula:

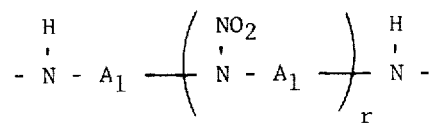

wherein $A_1$ is alkylene, preferably lower alkylene of from 1 to about 8 carbons and $r$ is 0 to 1. In the above formula, n is an integer of from 2 to about 4, the numerical value of n corresponding to the valency of $R_1$; $R'_1$ is hydrogen or lower alkyl of from 1 to about 8 carbons; and $Z_1$ is oxygen or sulfur.

Another class of aziridinyl curing agents which can be used to cure the functionally terminated polymers has the formula:

(II)
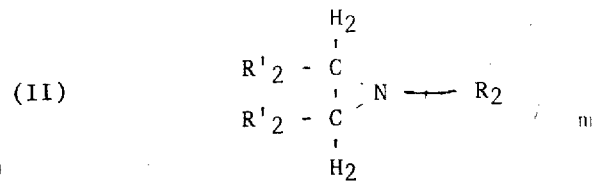

wherein $R_2$ is alkylene, preferably of from 1 to about 20 carbons; arylene, preferably of from 6 to 12 carbons; a trivalent radical of the formula:

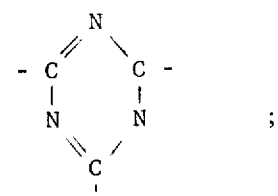

a divalent or trivalent radical of the formula:

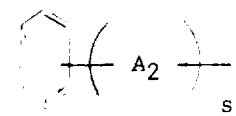

wherein $A_2$ is lower alkylene, preferably of from 2 to about 8 carbons, and $s$ is an integer equal to Z or 3; and a trivalent organic radical of the formula:

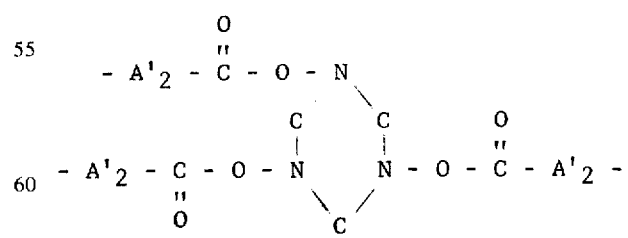

wherein $A'_2$ is lower alkylene, preferably of from 1 to about 8 carbons. In formuls (II), $m$ is an integer equal to the valence of $R_2$ and has a value of from 2 to about 4; and $R'_2$ is hydrogen or lower alkyl of from 1 to about 8 carbons.

It is to be understood that mixtures of any of the curing agents within the scope of Formulae (I) and (II) may be used in the practice of this invention.

Typical compounds within scope of Formula (I) are:
bis(1,2 propylene)adipamide
bis(1,2 propylene)isosebacamide
bis(ethylene)adipamide
bis(ethylene)isosebacamide
bis(1,2 butylene)adipamide
bis(1,2 butylene)isosebacamide
bis(1,2 butylene)glutaramide
bis(1,2 ethylene)glutaramide
bis(1,2 ethylene)suberamide
bis(1,2 propylene)suberamide
bis(1,2 ethylene)malonamide
bis(1,2 propylene)malonamide
bis(1,2 butylene)malonamide
bis(1,2 butylene)terephthalamide
tris(N,1',2'-butylene)trimesamide
1,8-diamino-octamethylene-bis [(1,2)-propylene] carboxamide
1,4-diamino-butamethylene-bis [(1,2)-butylene] carboxamide
1,6-diaminohexamethylene-bis [(1,2)-propylene] carboxamide
1,5-diamino-3-nitraza pentamethylene-bis [(1,2)-propylene] carboxamide
2,4β[(1,2)-propylene] carboxamide
[β-triamino-phenyl-tris [(1,2)-propylene] carboxamide
2,4,6-triamino-phenyl-tris [(1,2)-butylene] carboxamide
1,6-diaminohexamethylene-bis [(1,2)-pentylene] carboxamide
1,5-diamino-3-nitraza pentamethylene-bis [(1,2)-pentylene] carboxamide
2,4-diamino-tolyl-bis [(1,2)-pentylene] carboxamide
2,3,5-triamino-phenyl-tris [(1,2)-pentylene] carboxamide
2,4,6-triamino-phenyl-tris [(1,2)-pentylene] carboxamide Typical compounds encompassed by Formula (II) are:
1,4-bis(1-aziridinyl)butane
1,10-bis-(1-aziridinyl)decane
1,12-bis-(1-aziridinyl)dodecane
2,4,6-tris-(2-ethyl-1-aziridinyl)-s-triazine
2,4,6-tris(2-methyl-1-aziridinyl)-s-triazine
2,4,6-tris-(2-propyl-1-aziridinyl)-s-triazine
tris-1,3,5-(2-methylaziridinylpropionyl)-hexahydro-s-triazine
tris-1,3,5-(2-ethylaziridinylpropionyl)-hexahydro-s-triazine
bis [β-(N-propyleneimino)ethyl] benzene
bis [β-(N-ethyleneimino)ethyl] benzene
bis [β-(N-butyleneimino)ethyl] benzene
tris ['-(N-propyleneimino)ethyl] benzene
tris [-(N-ethyleneimino)ethyl] benzene
tris [β-(N-butyleneimino)ethyl] benzene
1,3-bis-(1-aziridinyl)propane
1,8-bis-(1-aziridinyl)octane
1,6-bis-(1-aziridinyl)hexane and
p-phenylene diethylene imine.

The functionally terminated polymers which can be cured by the above-mentioned curing agents are normally liquid and have the formula:

(III)

$$A_3(Y_3)_p$$

wherein $A_3$ is a polymer of monomers containing a vinylidene (—CH=CH—) group, $Y_3$ is a terminally reactive group selected from the group consisting of hydroxy, mercapto (SH), amino and carboxy, and $p$ is an integer of at least 2 and generally an integer of from 2 to about 4. Normally, the $A_3$ group has a valence equal to $p$.

Included among these polymers are homopolymers of conjugated dienes having from 4 to 12 carbon atoms, preferably the polymers of conjugated dienes having 4 to 8 carbons per molecule, such as 1,3-butadiene, isoprene, piperylene, methylpentadine, 2-methyl-1,3-hexadiene, phenylbutadiene, 3,4-dimethyl-1,3-hexadiene and 4,5-diethyl-1,3-octadiene. Among these, butadiene, isoprene and piperylene are preferred.

Specific types of preferred polydiolefins are those from butadiene or isoprene containing the following weight percentages of:

1,2-vinyl $-\!\!\left(\!\!\begin{array}{c}CH_2-CH\\ |\\ CH\\ ||\\ CH_2\end{array}\!\!\right)\!\!-$ ;

1,4-cis $-\!\!\left(\!\!CH_2\!\!\begin{array}{c}H\ \ H\\ |\ \ |\\ C=C\\ \end{array}\!\!CH_2\!\!\right)\!\!-$ ; and 1,4-trans $-\!\!\left(\!\!CH_2\!\!\begin{array}{c}H\\ |\\ C\\ ||\\ C\\ |\\ H\end{array}\!\!CH_2\!\!\right)\!\!-$ linkages in the polymer chain:

| Polymer | Weight % 1,2-vinyl | Weight % 1,4-cis | Weight % 1,4-trans |
|---|---|---|---|
| A | 25 | 40 | 35 |
| B | 70 | 15 | 14 |
| C | 5 | 90 | 5 |

In addition to the conjugated dienes, other monomers which can be employed are isobutylene; aryl-substituted olefins, such as styrene, various alkyl styrenes, such as vinyltoluene, para-methoxystyrene, vinylnaphthalene, and the like; heterocyclic nitrogen-containing monomers, such as vinyl pyridine and vinyl quinoline; acrylic acid esters, such as methyl methacrylate, ethyl methacrylate, propyl methacrylate, ethyl ethacrylate, butyl methacrylate, methyl vinyl ether, vinyl chloride, vinylidene chloride, vinyl acetate, vinylfuran, vinylcarbazole and vinylacetylene.

Polymers containing carboxy groups along the polymer chain, such as polymers of acrylic acid or methacrylic acid, can be cured using the above-mentioned curing agent. Similarly, polyvinyl alcohol may be used.

The curing system of this invention can also be used to treat polymers of monoolefins having 2 to 8 carbon atoms such as polyethylene, polypropylene, polybutene, copolymers of ethylene with propylene or 1-butene; and chlorinated, brominated, fluorinated and chlorosulfonated polymers such as polychloroprene, polybromoprene, polyfluoroprene, chlorinated polyethylene, chlorinated polypropylene, brominated isobutylene-isoprene copolymer, chlorosulfonated polyethylene and chlorosulfonated polypropylene.

The above compounds, in addition to being polymerizable alone, are also copolymerizable with each othe and may be copolymerized to form terminally reactive polymers. In addition, copolymers and terpolymers can be prepared using minor amounts of other ethylenically unsaturated monomers interpolymerizable with the above compounds. Typical of such monomers are vinylene carbonate, trans-vinylene diisocyanate, allyl alcohol, divinyl sulfone, acrylamide, vinyl amine and acrylonitrile. Preferred interpolymers are those from butadiene and acrylic acid, and from butadiene, acrylic acid and acrylonitrile.

The terminally reactive polymers in addition to including homopolymers and copolymers of the above materials also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth.

The polymers of the above formula generally have a molecular weight from about 1,000 to about 20,000, and more preferably, a molecular weight of from about 4,000 to about 8,000. 8c These polymers are generally liquid at room temperature and have a viscosity at 77°F of from 5 to about 500 poise, more preferably from about 100 to about 350 poise.

The curing process of this invention has particular utility in treating terminally reactive polymers containing terminal carboxy groups. As used herein, the term "terminally reactive polymer" denotes a polymer containing a reactive group on both ends of the polymer chain.

These functionally terminated polymers may be prepared in a variety of ways. One method of preparing these polymers is disclosed in U.S. Pat. No. 3,097,193, issued July 9, 1963. Certain of the above polymers may also be prepared according to the process disclosed in U.S. Pat. No. 2,877,212, issued Mar. 10, 1959.

In a preferred embodiment of this invention the polymers of the above formula are cured with a mixture of curing agents, consisting essentially of curing agents of Formulae (I) or (II) in conjunction with the curing agents of the formula:

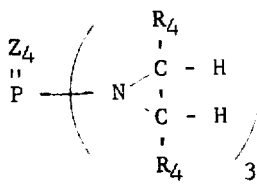

(IV)

wherein $Z_4$ is selected from a group consisting of oxygen and sulfur and each of the $R_4$ groups is selected from a group consisting of hydrogen and hydrocarbyl, such as, alkyl, cycloalkyl, aryl, aralkyl and alkaryl. Preferably when $R_4$ is hydrocarbyl, the $R_4$ groups contain from 1 to about 20 carbon atoms.

Typical compounds within the scope of Formula (IV) are:

tris(1-aziridinyl)phosphine oxide,
tris(2-methyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl3-n-butyl-1-aziridinyl)phosphine oxide,
tri(2-ethyl-3-decyl-1-aziridinyl)phosphine oxide,
tri(2-ethyl-3-octadecyl-1-aziridinyl)phosphine oxide,
tri(2-methyl-3-cyclopentyl-1-aziridinyl)phosphine oxide,
tri(2-phenyl-1-aziridinyl)phosphine oxide,
tri [2-ethyl-3-(1-naphthyl)1-aziridinyl] phosphine oxide,
tri(2-methyl-3-benzyl-1-aziridinyl)phosphine oxide,
tri [2-ethyl-3-(3-n-propylphenyl)1-aziridinyl] phosphine,
tri(1-aziridinyl)phosphine sulfide,
tri(2-methyl-1-aziridinyl)phosphine sulfide,
tri(2,3-dimethyl-1-aziridinyl)phosphine sulfide,
tri(2-eicosyl-1-aziridinyl)phosphine sulfide,
tri(2-methyl-3-cyclohexyl-1-aziridinyl)phosphine sulfide, and
tri(2-phenyl-3-benzyl-1-aziridinyl)phosphine sulfide.

Generally, when the curatives of Formula (IV) are used in combination with those of Formulae (I) or (II), the mole ratio of the former to the latter is from about 1 to 10 to about 10 to 1.

The following examples which are presented for purposes of illustration only illustrate the use of the curing agents of this invention in a variety of applications.

EXAMPLE I

Cure of Liquid Polymer

When 0.8 grams of tris(N-1',2'-butylene)trimesamide and 40 grams of mica are blended with 38.2 grams of the liquid carboxy-terminated polybutadiene (M.W. = 6000) and maintained at 120°F for several hours, a solid cured rubber is obtained.

When the following formulations are cured in the foregoing manner, similar results are obtained.

TABLE I

| Example No. | Liquid Polymer | Curative* |
|---|---|---|
| II | Carboxy-terminated polyisoprene (M.W. = 6000) | bis-(1,2-propylene) isosebacamide |
| III | Carboxy-terminated polychloroprene (M.W. = 6000) | bis-(1,2-butylene) adipamide |
| IV | Carboxy-terminated butadiene-styrene copolymer (M.W. = 5000) | 2,4,6-tris-(2-methyl-1-aziridinyl)-5-triazine |
| V | Butadiene-acrylonitrile-acrylic acid terpolymer (M.W. = 5000) | tris-1,3,5-(1-ethyl-aziridinyl propionyl)-hexahydro-s-triazine |

TABLE I—Continued

| Example No. | Liquid Polymer | Curative* |
|---|---|---|
| VI | Butadiene-acrylic acid copolymer (M.W. = 5000) | bis [β-(N-propylene-imino) ethyl]benzene |
| VII | Hydroxy-terminated polyisobutylene (M.W. = 4000) | 1,5-diamino-3-nitraza pentamethylene-bis [(1,2)-propylene] carboxamide |
| VIII | Amine-terminated polybutadiene (M.W. = 4000) | 2,4,6-triaminophenyl-tris [(1,2)-propylene] carboxamide |
| IX | Mercapto-terminated polyisoprene (M.W. = 5000) | 1,12-bis(1-aziridinyl) dodecane |

*The curative being employed in each case in about a stoichiometric amount.

The cured rubber has a wide variety of uses. Thus, rubbers of this type find application in electrical wire insulation, tank linings, cements, hoses and belting.

The cured rubber compositions of this invention normally contain the following ingredients in the percentages indicated:

liquid polymer — about 5 to about 90 parts by weight per 100 parts of total rubber composition, curing agent — an effective amount in the order of about 0.1 to about 20 parts by weight per 100 parts of total rubber composition, fillers — 0 to about 60 parts by weight per 100 parts of total rubber composition.

In addition, this rubber composition may contain plasticizers, stabilizers and other additives well-known in the rubber art. Preferred fillers are materials such as titanium dioxide, mica and carbon black.

The functionally-terminated polymers, containing the curing agent and other additives, can be cured to a solid product at room temperature or below, or at high temperatures, if desired. Normally, curing is carried out at a temperature of from about 40°F to about 150°F. It is to be understood that curing can be carried out at higher temperatures although such is not necessary and, as has been pointed out above, is sometimes undesirable.

Propellants may be prepared from the functionally terminated polymers by the interblending of an oxidizer and the curing agent, followed by curing. A wide variety of solid oxidizers may be used in combination with our cured polymers. Typical of suitable inorganic oxidizers are the alkali metal and alkaline earth metal perchlorates, chlorates, nitrates, chromates, dichromates and permanganates. Illustrative of such oxidizers and lithium perchlorate, potassium perchlorate, calcium perchlorate, potassium chlorate, calcium chlorate, potassium chromate, potassium dichromate, potassium nitrate, lithium nitrate, potassium permanganate and calcium nitrate. Likewise, ammonium salts of the above-mentioned anions can be used such as ammonium perchlorate, ammonium nitrate, ammonium dichromate and ammonium permanganate. Still another suitable inorganic oxidizer is hydrazine perchlorate. Illustrative of the organic oxidizers suitable in the practice of this invention are cellulose nitrate, guanidiene nitrate and ethylene diamine diperchlorate.

In general, the propellant compositions of our invention comprise:

liquid polymer — about 5 to about 40 parts by weight per 100 parts of total propellant composition, oxidizer — about 40 to about 90 parts by weight per 100 parts of total propellant composition, curing agent — an effective amount in the order of about 0.05 to about 20 parts by weight per 100 parts of total propellant composition, with any desired additional ingredients being present in the balance of the composition which can include combustion additives, fillers, stabilizers, plasticizers, etc.

More preferably, the propellant composition comprises:

liquid polymer — about 5 to about 20 parts by weight per 100 parts of total propellant composition, oxidizer — about 65 to about 72 parts by weight per 100 parts of total propellant composition, curing agent — about 0.1 to about 10 parts by weight per 100 parts of total propellant composition.

Combustion additives such as the powdered metals, i.e., powdered aluminum, powdered beryllium, etc., may also be added to the propellant composition of this invention. The preferred powdered metals are those having an average particle size of 25 to 28 microns. These powdered metal combustion additives serve to increase the specific impulse of the resulting propellant. The combustion additives are generally advantageously employed in an amount of from about 25 to about 200 parts by weight for each 100 parts of the liquid polymer used in the formulation. Preferred of our propellants are those in which the amount of oxidizer plus combustion additive constitutes about 75 to about 90 percent by weight of the total propellant composition with the propellant having an oxygen balance of about zero to about −60, calculated on the basis of total conversion of the carbon, hydrogen, and metal in the propellant to carbon dioxide, water and metal oxide, respectively.

The propellant compositions of this invention may contain optionally, in addition to the above-mentioned ingredients, other additaments such as wetting agents, combustion catalysts, stabilizers, fillers, plasticizers and processing aids.

Thus, there may be added to the propellant composition prior to curing from about 5 to about 50 parts by weight of plasticizer per 100 parts of liquid polymer. Typical plasticizers are materials such as hydrocarbon oils, fluorinated plasticizers, waxes, asphalts, higher aliphatic and aromatic esters and resins such as hydrogenated ester gums. Preferred plasticizers and isodecyl pelargonate, polybutene, and the nitro-plasticizers disclosed in Assignee's copending U.S. patent application, Ser. No. 2,072, filed Jan. 12, 1960. Suitable combustion catalysts include copper chromite, milori blue and iron oxide.

The propellant interblending procedure to be followed in the practice of our invention is as follows: a liquid polymer, as defined above, is added to an internal mixer and is degassed. Then the wetting agents, stabilizers, fillers, processing aids, plasticizers and combustion additives are added to the polymer and mixed for a period of time necessary for their incorporation into the polymer. The oxidizer, or oxidizers, then added in increments and mixed under vacuum. After all the oxidizer has been incorporated, the curative is added and mixed under vacuum until it is incorporated. The mixture is then cast, preferably under vacuum, from the mixer into containers. Many modifications of this procedure are possible. Thus, the liquid polymer and the plasticizer may be added simultaneously to the mixer.

The mixer which we have found to be particularly effective for interblending our propellant ingredients is that known commercially as the P mixer. The P mixer is manufactured by Baker-Perkins, Inc., of Saginaw, Michigan, and it can be equipped with facilities for heating, cooling, and vacuumizing propellant batches during mixing.

EXAMPLE X

| Ingredient | Weight Percent |
|---|---|
| Ammonium perchlorate | 81.50 |
| Powdered aluminum | 5.00 |
| Copper chromite | 1.50 |
| Isodecyl pelargonate | 3.50 |
| Lecithin | 0.20 |
| Carboxy-terminated polybutadiene (M.W. = 6000) | 7.80 |
| Tris(N-1', 2'-butylene)mesamide | 0.24 |
| Tris(methyl aziridinyl)phosphine oxide | 0.26 |
| | 100.00 |

To a mixer which was maintained at about 70°F was added 7.8 parts of the liquid carboxy-terminated polybutadiene having a molecular weight of about 6000, 0.20 parts lecithin and 1.50 parts copper chromite. Then 3.5 parts of isodecyl pelargonate and 5 parts of aluminum powder having an average particle size of 25 to 28 microns were added. These ingredients were mixed until the aluminum was completely wetted down. The mixture was then degassed under vacuum for about 10 minutes, then 81.5 parts of ammonium perchlorate was added and mixing continued for about 20 minutes. Then 0.26 parts of tris(methylaziridinyl)phosphine oxide and 0.24 parts tris(N-1', 2'-butylene)mesamide were added as curing agents and mixing continued for an additional 5 minutes. During this time the temperature was maintained at about 120°F. The mixture was then cast and cured at 120°F for 16 hours. The resultant product was rubbery.

When the above example was repeated, using hydrazine perchlorate in lieu of the ammonium perchlorate, as the oxidizer, a satisfactory rubbery propellant was again obtained after curing for 16 hours at 80°F.

EXAMPLE XI

Following the procedure of Example X, the following propellants were prepared.

| Ingredient | Propellant A | Propellant B | Propellant C |
|---|---|---|---|
| Ammonium perchlorate | 73.00 | 73.00 | 74.00 |
| Powdered aluminum | 15.00 | 15.00 | 10.00 |
| Carboxy-terminated polybutadiene (M.W. = 6000) | 8.777 | 8.56 | 9.30 |
| Tris(methyl aziridinyl)phosphine oxide | 0.223 | — | 0.13 |
| Tris(N-1', 2'-butylene)-mesamide | — | 0.44 | 0.29 |
| Isodecyl pelargonate | 3.00 | — | 5.23 |
| Polybutene | — | 3.00 | — |
| Zirconium acetylacetonate | — | — | 0.05 |
| Iron oxide | — | — | 1.00 |
| | 100.00 | 100.00 | 100.00 |

After curing, the mechanical properties of each of the propellants prepared above were measured.

TABLE II

| Propellant | Maximum Tensile Strength PSI | Percent Elongation at Maximum Tensile |
|---|---|---|
| A | 84 | 29 |
| B | 102 | 36 |
| C | 140 | 32 |

As can be seen from the data appearing in Table II, the mechanical properties of the propellants of this invention (Propellant B and Propellant C) are superior to those of Propellant A.

Following the procedure set forth in Example X, propellants were prepared from the following ingredients:

EXAMPLE XII

| Ingredient | Weight Percent |
|---|---|
| Ammonium Perchlorate | 81.50 |
| Powdered aluminum | 5.00 |
| Milori blue | 1.50 |
| Isodecyl perlargonate | 5.00 |
| Diethanolamine adduct of oleic acid and succinic anhydride | 0.10 |
| Carboxy-terminated polybutadiene (M.W.=6000) | 6.40 |
| Tris(N-1', 2'-butylene)mesamide | 0.30 |
| Tris(methyl aziridinyl)phosphine oxide | 0.20 |
| | 100.00 |

EXAMPLE XIII

| Ingredient | Weight Percent |
|---|---|
| Ammonium perchlorate | 73.00 |
| Powdered aluminum | 15.00 |
| Iron oxide | 0.10 |
| Isodecyl pelargonate | 4.90 |
| Carboxy-terminated polybutadiene (M.W.=6000) | 6.55 |
| Bis-(1,2-propylene)isosebacamide | 0.25 |
| Tris-(methyl aziridinyl)phosphine oxide | 0.20 |
| | 100.00 |

EXAMPLE XIV

| Ingredient | Weight Percent |
|---|---|
| Ammonium perchlorate | 73.00 |
| Powdered aluminum | 15.00 |
| Iron oxide | 0.10 |
| Isodecyl pelargonate | 4.90 |
| Hydroxy-terminated polybutadiene (M.W.=6000) | 6.55 |
| Bis-(1,2-propylene)isosebacamide | 0.25 |
| Tris-(methyl aziridinyl)phosphine oxide | 0.20 |
| | 100.00 |

EXAMPLE XV

| Ingredient | Weight Percent |
|---|---|
| Ammonium perchlorate | 73.00 |
| Powdered aluminum | 15.00 |
| Iron oxide | 0.10 |
| Isodecyl pelargonate | 4.90 |
| Amine-terminated polyisoprene | 6.55 |
| Bis-(1,2-propylene)isosebacamide | 0.25 |
| Tris(methyl aziridinyl)phosphine oxide | 0.20 |
| | 100.00 |

EXAMPLE XVI

| Ingredient | Weight Percent |
|---|---|
| Ammonium perchlorate | 73.00 |
| Powdered aluminum | 15.00 |
| Iron oxide | 0.10 |
| Isodecyl pelargonate | 4.90 |
| Mercapto-terminated polyisobutylene | 6.55 |
| Bis-(1,2-propylene)isosebacamide | 0.25 |
| Tris-(methyl aziridinyl)phosphine oxide | 0.20 |
| | 100.00 |

Having fully described the invention, it is intended to be limited only by the lawful scope of the appended claims.

We claim:

1. A high energy propellant composition comprising an oxidizer and the reaction product of a terminally reactive polymer having the formula:

wherein $A_3$ comprises a polymer of a polymerizable vinylidene compound; $Y_3$ is selected from the group consisting of carboxy, hydroxy, amine and mercapto, and $p$ is an integer of at least 2; with a curing agent selected from the group consisting of those having the formula:

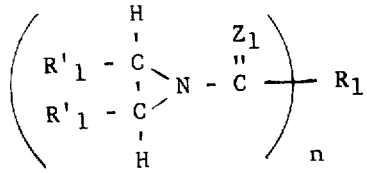

wherein $R_1$ is selected from the group consisting of alkylene, arylene, trivalent organic radicals of the formula:

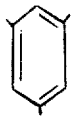

organic radicals of the formula:

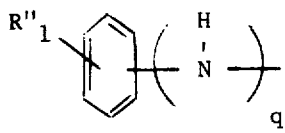

wherein $q$ is an integer of from 2 to 3 and $R''_1$ is selected from the group consisting of hydrogen and lower alkyl; and divalent radicals of the formula:

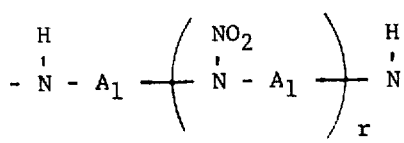

wherein $A_1$ is alkylene, and $r$ is selected from the group consisting of 0 and 1; $n$ is an integer of from 2 to about 4 and corresponds numerically to the valence of $R_1$; $R'_1$ is selected from the group consisting of hydrogen and lower alkyl and $Z_1$ is selected from the group consisting of oxygen and sulfur; and those having the formula:

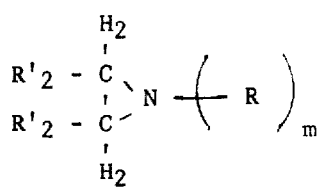

wherein $R_2$ is selected from the group consisting of alkylene, arylene, a trivalent radical of the formula:

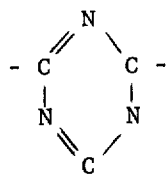

a radical of the formula:

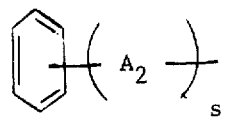

wherein $A_2$ is lower alkylene and $s$ is an integer of from 2 to 3; and a trivalent organic radical of the formula:

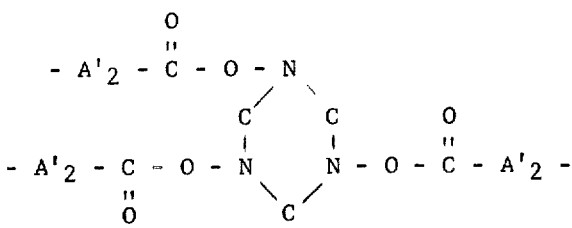

wherein $A'_2$ is lower alkylene; $m$ is an integer of from 2 to about 4, and corresponds numerically to the valence of $R_2$, and $R'_2$ is selected from the group consisting of hydrogen and lower alkyl.

2. A high energy propellant composition comprising an oxidizer and the reaction product of a terminally reactive polymer having the formula:

wherein $A_3$ comprises a polymer of a polymerizable vinylidene compound, $Y_3$ is selected from the group consisting of carboxy, hydroxy, amine and mercapto, and $p$ is an integer of at least 2; with a curing agent having the formula:

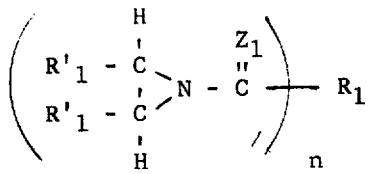

wherein $R_1$ is selected from the group consisting of alkylene, arylene, trivalent organic radicals of the formula:

organic radicals of the formula:

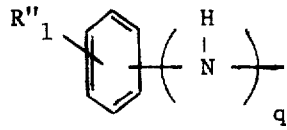

wherein $q$ is an integer of from 2 to 3 and $R''_1$ is selected from the group consisting of hydrogen and lower alkyl, and divalent radicals of the formula:

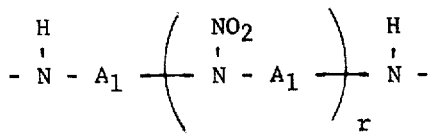

wherein $A_1$ is alkylene, and $r$ is selected from the group consisting of 0 and 1; $n$ is an integer of from 2 to about 4 and corresponds numerically to the valence of $R_1$, $R'_1$ is selected from the group consisting of hydrogen and lower alkyl and $Z_1$ is selected from the group consisting of oxygen and sulfur.

3. A high energy propellant composition comprising an oxidizer and the reaction product of a terminally reactive polymer having the formula:

wherein $A_3$ comprises a polymer of a polymerizable vinylidene compound, $Y_3$ is selected from the group consisting of carboxy, hydroxy amine and mercapto, and $p$ is an integer of at least 2; with a curing agent having the formula:

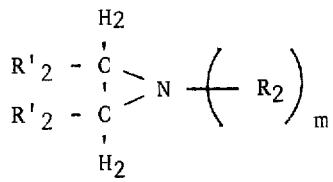

wherein $R_2$ is selected from the group consisting of alkylene, arylene, a trivalent radical of the formula:

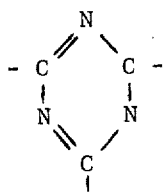

a radical of the formula:

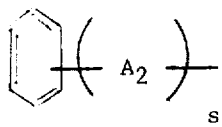

wherein $A_2$ is lower alkylene and $s$ is an integer of from 2 to 3; and a trivalent organic radical of the formula:

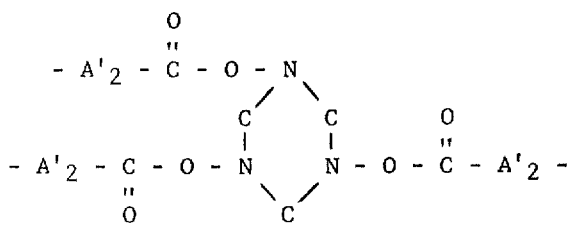

wherein $A'_2$ is lower alkylene; $m$ is an integer of from 2 to about 4, and corresponds numerically to the valence of $R_2$, and $R'_2$ is selected from the group consisting of hydrogen and lower alkyl.

4. A high energy propellant composition comprising an oxidizer and the reaction product of a terminally reactive polymer having the formula:

wherein $A_3$ comprises a polymer of a polymerizable vinylidene compound, $Y_3$ is selected from the group consisting of carboxy, hydroxy, amine, and mercapto, and $p$ is an integer of at least 2; with a curing agent mixture containing at least one curing agent selected from the group consisting of those having the formula:

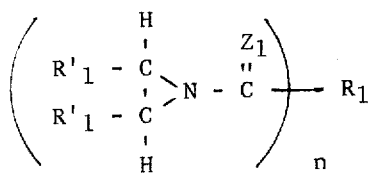

wherein $R_1$ is selected from the group consisting of alkylene, arylene, trivalent organic radicals of the formula:

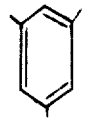

organic radicals of the formula:

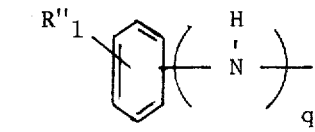

wherein $q$ is an integer of from 2 to 3 and $R''_1$ is selected from the group consisting of hydrogen and lower alkyl, and divalent radicals of the formula:

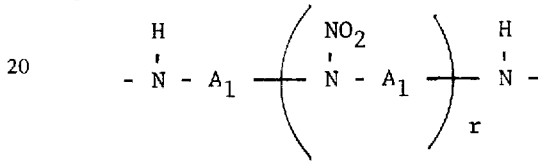

wherein $A_1$ is alkylene, and $r$ is selected from the group consisting of 0 and 1; $n$ is an integer of from 2 to about 4 and corresponds numerically to the valence of $R_1$, $R'_1$ is selected from the group consisting of hydrogen and lower alkyl and $Z_1$ is selected from the group consisting of oxygen and sulfur; and those having the formula:

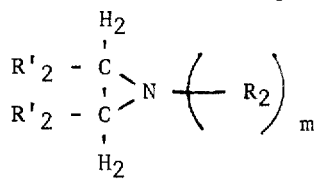

wherein $R_2$ is selected from the group consisting of alkylene, arylene a trivalent radical of the formula:

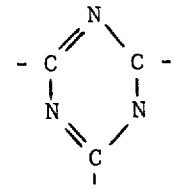

a radical of the formula:

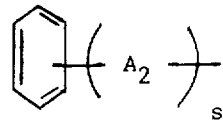

wherein $A_2$ is lower alkylene and $s$ is an integer of from 2 to 3; and a trivalent organic radical of the formula.

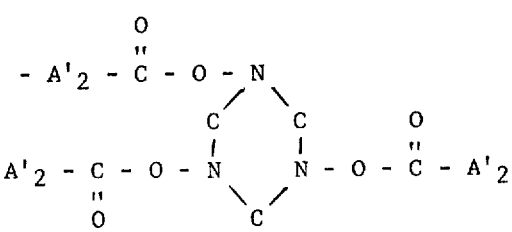

wherein A′$_2$ is lower alkylene, $m$ is an integer of from 2 to about 4, and corresponds numerically to the valence of R$_2$, and R′$_2$ is selected from the group consisting of hydrogen and lower alkyl, and at least one curing agent having the general formula:

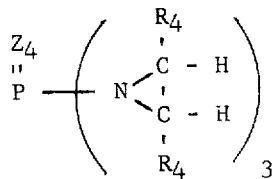

wherein Z$_4$ is selected from the group consisting of oxygen and sulfur, and R$_4$ is selected from the group consisting of hydrogen and hydrocarbyl.

5. A high energy propellant composition comprising an oxidizer and the reaction product of a terminally reactive polymer having the formula:

A$_3$(Y$_3$)$_p$ wherein A$_3$ comprises a polymer of a polymerizable vinylidene compound, Y$_3$ is selected from the group consisting of carboxy, hydroxy, amine, and mercapto, and $p$ is an integer of at least 2; with a curing agent mixture containing at least one curing agent selected from the group consisting of those having the formula:

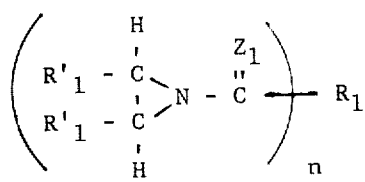

wherein R$_1$ is selected from the group consisting of alkylene, arylene, trivalent organic radicals of the formula:

organic radicals of the formula:

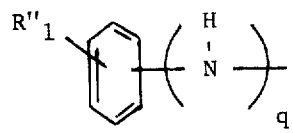

wherein $q$ is an integer of from 2 to 3 and R″$_1$ is selected from the group consisting of hydrogen and lower alkyl, and divalent radicals of the formula:

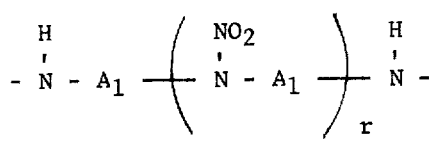

wherein A$_1$ is alkylene, and $r$ is selected from the group consisting of 0 and 1; $n$ is an integer of from 2 to about 4 and corresponds numerically to the valence of R$_1$; R′$_1$ is selected from the group consisting of hydrogen and lower alkyl and Z$_1$ is selected from the group consisting of oxygen and sulfur, and at least one curing agent having the general formula:

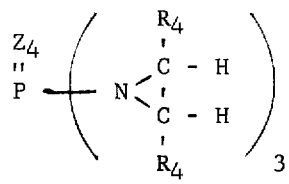

wherein Z$_4$ is selected from the group consisting of oxygen and sulfur, and R$_4$ is selected from the group consisting of hydrogen and hydrocarbyl.

6. A high energy propellant composition comprising an oxidizer and the reaction product of a terminally reactive polymer having the formula:

A$_3$(Y$_3$)$_p$ wherein A$_3$ comprises a polymer of a polymerizable vinylidene compound, Y$_3$ is selected from the group consisting of carboxy, hydroxy, amine, and mercapto, and $p$ is an integer of at least 2, with a curing agent mixture containing at least one curing agent having the formula:

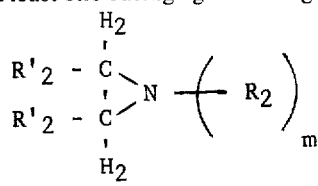

wherein R$_2$ is selected from the group consisting of alkylene, arylene, a trivalent radical of the formula:

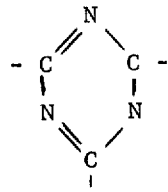

a radical of the formula:

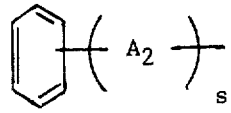

wherein A$_2$ is lower alkylene and $s$ is an integer of from 2 to 3 and a trivalent organic radical of the formula:

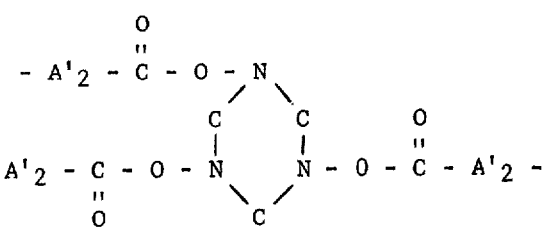

wherein A′$_2$ is lower alkylene; $m$ is an integer of from 2 to about 4, and corresponds numerically to the valence of R$_2$; and R′$_2$ is selected from the group consisting of hydrogen and lower alkyl, and at least one curing agent having the general formula:

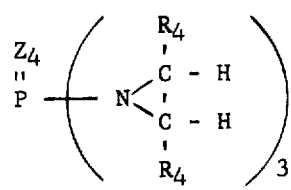

wherein $Z_4$ is selected from the group consisting of oxygen and sulfur, and $R_4$ is selected from the group consisting of hydrogen and hydrocarbyl.

7. A high energy propellant composition comprising an oxidizer and the reaction product of from about 5 to about 90 parts by weight of a terminally reactive polymer having the formula:

$$A_3(Y_3)_p$$

wherein $A_3$ comprises a polymer of a polymerizable vinylidene compound, $Y_3$ is selected from the group consisting of carboxy, hydroxy, amine and mercapto; and $p$ is an integer of at least 2, with from about 0.1 to about 20 parts by weight of a curing agent selected from the group consisting of those having the formula:

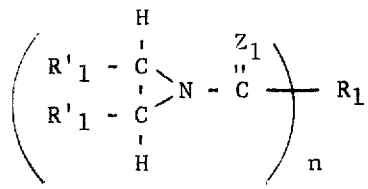

wherein $R_1$ is selected from the group consisting of alkylene, arylene, trivalent organic radicals of the formula:

organic radicals of the formula:

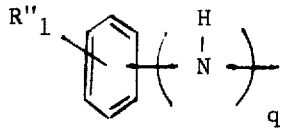

wherein $q$ is an integer of from 2 to 3 and $R''_1$ is selected from the group consistig of hydrogen and lower alkyl, and divalent radicals of the formula:

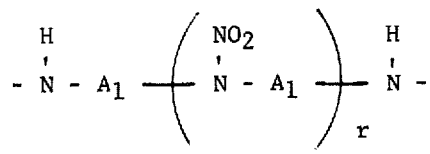

wherein $A_1$ is alkylene, and $r$ is selected from the group consisting of 0 and 1; $n$ is an integer of from 2 to about 4 and corresponds numerically to the valence of $R_1$; $R'_1$ is selected from the group consisting of hydrogen and lower alkyl and $Z_1$ is selected from the group consisting of oxygen and sulfur; and those having the formula:

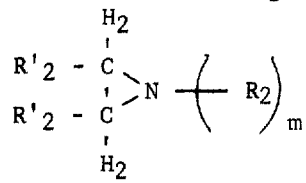

wherein $R_2$ is selected from the group consisting of alkylene, arylene, a trivalent radical of the formula:

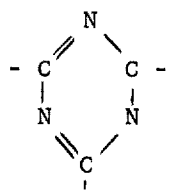

a radical of the formula:

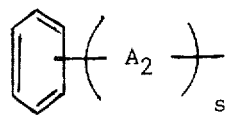

wherein $A_2$ is lower alkylene and $s$ is an integer of from 2 to 3; and a trivalent organic radical of the formula:

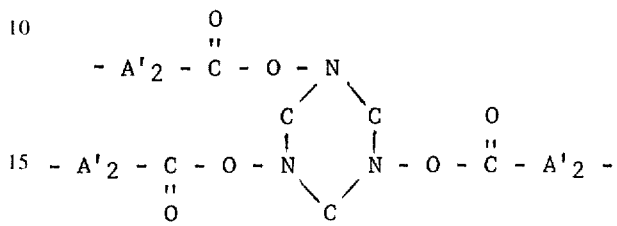

wherein $A'_2$ is lower alkylene; $m$ is an integer of from 2 to about 4, and corresponds numerically to the valence of $R_2$, and $R'_2$ is selected from the group consisting of hydrogen and lower alkyl.

8. A high energy propellant composition comprising an oxidizer and the reaction product of from about 5 to about 90 parts by weight of a terminally reactive polymer having the formula:

$$A_3(Y_3)_p$$

wherein $A_3$ comprises a polymer of a polymerizable vinylidene compound, $Y_3$ is selected from the group consisting of carboxy, hydroxy, amine and mercapto; and $p$ is an integer of at least 2, with from about 0.1 to about 20 parts by weight of a curing agent selected from the group consisting of those having the formula:

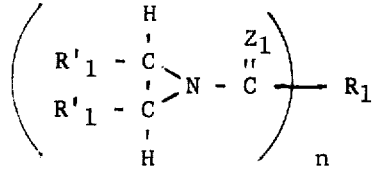

wherein $R_1$ is selected from the group consisting of alkylene, arylene, trivalent organic radicals of the formula:

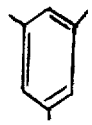

organic radicals of the formula:

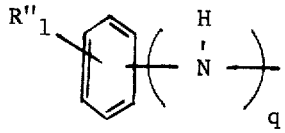

wherein $q$ is an integer of from 2 to 3 and $R''_1$ is selected from the group consisting of hydrogen and lower alkyl, and divalent radicals of the formula:

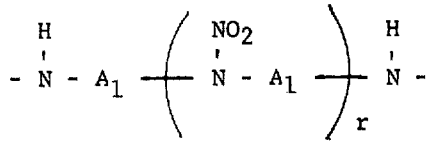

wherein $A_1$ is alkylene, and $r$ is selected from the group consisting of 0 to 1; $n$ is an integer of from 2 to about 4 and corresponds numerically to the valence of $R_1$; $R'_1$ is selected from the group consisting of hydrogen and lower alkyl and $Z_1$ is selected from the group consisting of oxygen and sulfur.

9. The composition of claim 8 wherein the curing agent is tris(N-1', 2'-butylene)trimesamide.

10. The composition of claim 8 wherein the curing agent is bis(1,2-propylene)isosebacamide.

11. A high energy propellant composition comprising an oxidizer and the reaction product of from about 5 to about 90 parts by weight of a terminally reactive polymer having the formula:

$$A_3(Y_3)_2$$

wherein $A_3$ comprises a polymer of a polymerizable diene compound, and $Y_3$ is carboxy; with from about 0.1 to about 20 parts by weight of a curing agent mixture containing at least one curing agent selected from the group consisting of those having the formula:

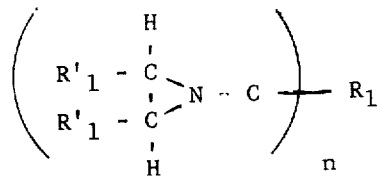

wherein $R_1$ is selected from the group consisting of alkylene, arylene, trivalent organic radicals of the formula:

organic radicals of the formula:

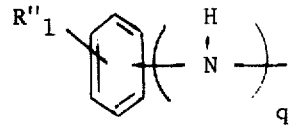

wherein $q$ is an integer of from 2 to 3 and $R''_1$ is selected from the group consisting of hydrogen and lower alkyl, and divalent radicals of the formula:

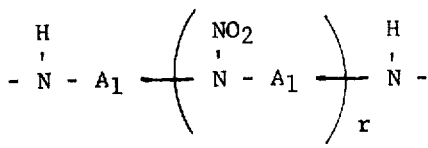

wherein $A_1$ is alkylene, and $r$ is selected from the group consisting of 0 and 1; $n$ is an integer of from 2 to about 4 and corresponds numerically to the valence of $R_1$; $R'_1$ is selected from the group consisting of hydrogen and lower alkyl and $Z_1$ is selected from the group consisting of oxygen and sulfur; and those having the formula:

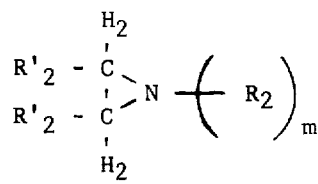

wherein $R_2$ is selected from the group consisting of alkylene, arylene, a trivalent radical of the formula:

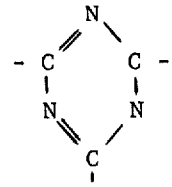

a radical of the formula:

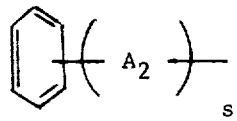

wherein $A_2$ is lower alkylene and $s$ is an integer of from 2 to 3; and a trivalent organic radical of the formula:

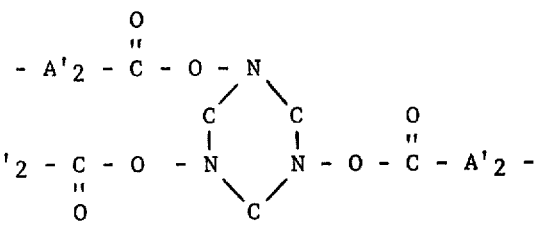

wherein $A'_2$ is lower alkylene; $m$ is an integer of from 2 to about 4, and corresponds numerically to the valence of $R_2$; and $R'_2$ is selected from the group consisting of hydrogen and lower alkyl, and at least one curing agent having the general formula:

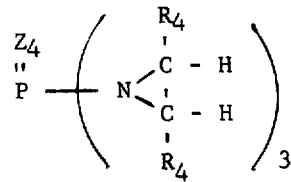

wherein $Z_4$ is selected from the group consisting of oxygen and sulfur, and $R_4$ is selected from the group consisting of hydrogen and hydrocarbyl.

12. The composition of claim 11 wherein the curing agent mixture comprises tris(N-1',2'-butylene)trimesamide and tris(methyl aziridinyl)phosphine oxide.

13. The composition of claim 11 wherein the curing agent mixture comprises bis(1,2-propylene)isosebacamide and tris(methyl aziridinyl)phosphine oxide.

* * * * *